(12) United States Patent
Kang et al.

(10) Patent No.: US 12,439,029 B2
(45) Date of Patent: Oct. 7, 2025

(54) VIDEO ENCODING AND DECODING USING DEEP LEARNING BASED INTER PREDICTION

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(*) Notice: Subject to any disclaimer, the term of this patent is extended or adjusted under 35 U.S.C. 154(b) by 76 days.

(21) Appl. No.: 18/019,437

(22) PCT Filed: Aug. 6, 2021

(86) PCT No.: PCT/KR2021/010425
§ 371 (c)(1),
(2) Date: Feb. 2, 2023

(87) PCT Pub. No.: WO2022/031115
PCT Pub. Date: Feb. 10, 2022

(65) Prior Publication Data
US 2023/0291926 A1    Sep. 14, 2023

(30) Foreign Application Priority Data

Aug. 6, 2020  (KR) .................... 10-2020-0098414
Aug. 6, 2021  (KR) .................... 10-2021-0103569

(51) Int. Cl.
*H04N 19/105*    (2014.01)
*H04N 19/109*    (2014.01)
(Continued)

(52) U.S. Cl.
CPC ......... *H04N 19/105* (2014.11); *H04N 19/109* (2014.11); *H04N 19/13* (2014.11);
(Continued)

(58) Field of Classification Search
CPC .... H04N 19/176; H04N 19/70; H04N 19/105; H04N 19/117; H04N 19/139;
(Continued)

(56) References Cited

U.S. PATENT DOCUMENTS 10,841,577 B2    11/2020    Cho et al.
11,019,355 B2    5/2021    Cho et al.
(Continued)

FOREIGN PATENT DOCUMENTS

KR    20190033403 A    3/2019
KR    20190096281 A    8/2019
(Continued)

OTHER PUBLICATIONS

Chao Dong et al., Compression Artifacts Reduction by a Deep Convolutional Network, 2015 IEEE International Conference on Computer Vision (ICCV); 2015, 9 pp.
(Continued)

*Primary Examiner* — Daniel Chang
(74) *Attorney, Agent, or Firm* — Lempia Summerfield Katz LLC

(57) ABSTRACT

A video encoding or decoding apparatus and method perform existing inter prediction on a current block to generate a motion vector and predicted samples. The video encoding or decoding apparatus and method generate enhanced predicted samples for the current block using a deep learning-
(Continued)

based video prediction network (VPN) on the basis of the motion vector, the reference samples, the predicted samples, and the like to improve encoding efficiency.

7 Claims, 11 Drawing Sheets

(51) Int. Cl.
| | |
|---|---|
| H04N 19/13 | (2014.01) |
| H04N 19/132 | (2014.01) |
| H04N 19/139 | (2014.01) |
| H04N 19/176 | (2014.01) |
| H04N 19/42 | (2014.01) |
| H04N 19/52 | (2014.01) |

(52) U.S. Cl.
CPC ......... *H04N 19/132* (2014.11); *H04N 19/139* (2014.11); *H04N 19/176* (2014.11); *H04N 19/42* (2014.11); *H04N 19/52* (2014.11)

(58) Field of Classification Search
CPC .......... G06N 3/045; G06N 3/08; G06N 3/088; G06N 20/00; G06N 3/02; G06N 3/049; G06N 3/044; G06T 2207/20084; G06T 9/002
See application file for complete search history.

(56) References Cited

U.S. PATENT DOCUMENTS

| | | | | |
|---|---|---|---|---|
| 2015/0201212 | A1* | 7/2015 | Zhang | H04N 19/577 |
| | | | | 375/240.15 |
| 2017/0127082 | A1* | 5/2017 | Chen | H04N 19/517 |
| 2017/0357879 | A1* | 12/2017 | Odaibo | G06N 20/00 |
| 2018/0122114 | A1* | 5/2018 | Luan | H04N 21/44016 |
| 2018/0249158 | A1 | 8/2018 | Huang et al. | |
| 2018/0330506 | A1* | 11/2018 | Grady | G06T 7/174 |
| 2019/0043193 | A1* | 2/2019 | Odaibo | G06F 18/285 |
| 2019/0096052 | A1* | 3/2019 | Sukhomlinov | G07C 5/12 |
| 2019/0246102 | A1* | 8/2019 | Cho | G06N 3/045 |
| 2019/0306526 | A1 | 10/2019 | Cho et al. | |
| 2019/0313102 | A1* | 10/2019 | Cho | H04N 19/11 |
| 2020/0074178 | A1* | 3/2020 | Guo | G06N 3/049 |
| 2020/0089958 | A1* | 3/2020 | Zhu | G06V 20/40 |
| 2020/0117901 | A1* | 4/2020 | McClernon | G08B 31/00 |
| 2020/0126210 | A1* | 4/2020 | Li | G06F 16/532 |
| 2020/0167586 | A1* | 5/2020 | Gao | G06V 10/82 |
| 2020/0186820 | A1* | 6/2020 | Park | H04N 19/105 |
| 2020/0186821 | A1* | 6/2020 | Park | H04N 19/174 |
| 2020/0211236 | A1* | 7/2020 | Zhang | G06N 3/045 |
| 2020/0252654 | A1* | 8/2020 | Su | H04N 19/176 |
| 2020/0311543 | A1* | 10/2020 | Jamali | G06N 3/084 |
| 2020/0320697 | A1* | 10/2020 | Wang | G06T 7/0012 |
| 2021/0026446 | A1* | 1/2021 | Liu | G06V 10/774 |
| 2021/0042580 | A1* | 2/2021 | Chen | G06N 3/08 |
| 2021/0195234 | A1* | 6/2021 | Zhang | H04N 19/70 |
| 2021/0390355 | A1* | 12/2021 | Xu | G06F 18/214 |
| 2022/0148290 | A1* | 5/2022 | Zhang | G06V 10/774 |
| 2023/0291926 | A1* | 9/2023 | Kang | H04N 19/52 |
| 2024/0153033 | A1* | 5/2024 | Wang | H04N 19/103 |

FOREIGN PATENT DOCUMENTS

| | | | |
|---|---|---|---|
| KR | 20200050433 A | 5/2020 | |
| WO | WO-2022011571 A1 * | 1/2022 | G06T 3/4007 |

OTHER PUBLICATIONS

International Search Report and Written Opinion cited in corresponding international application No. PCT/KR2021/010425; Nov. 15, 2021; 10pp.

Ren Yang et al., Multi-Frame Quality Enhancement for Compressed Video, 2018 IEEE/CVF Conference on Computer Vision and Pattern Recognition, 2018, 10 pp.

* cited by examiner

VIDEO ENCODING AND DECODING USING DEEP LEARNING BASED INTER PREDICTION

CROSS-REFERENCE TO RELATED APPLICATIONS

This application is a U.S. national stage of International Application No. PCT/KR2021/010425, filed on Aug. 6, 2021, which claims priority to Korean Patent Application No. 10-2020-0098414 filed on Aug. 6, 2020, and Korean Patent Application No. 10-2021-0103569 filed on Aug. 6, 2021, the entire disclosures of which are incorporated herein by reference.

TECHNICAL FIELD

The present disclosure relates to encoding or decoding of videos. More specifically, the present disclosure relates to a video encoding or decoding apparatus and method for performing existing inter prediction on a current block to generate a motion vector and predicted samples. The apparatus and method are also for generating enhanced predicted samples for the current block using a deep learning-based video prediction network (VPN) on the basis of the motion vector, reference samples, the predicted samples, and the like to improve encoding efficiency.

BACKGROUND

The descriptions below provide only the background information related to the present disclosure and do not constitute the prior art.

Since video data has a large amount of data compared to audio or still image data, it requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher encoding efficiency and an improved image enhancement effect than existing compression techniques is required.

Recently, a deep learning-based video processing technology is being applied to an existing encoding element technology. The deep learning-based video processing technology is applied to a compression technology, such as inter prediction, intra prediction, in-loop filter, or transform among existing encoding technologies, to improve encoding efficiency. Representative application examples include inter prediction based on a virtual reference frame generated on the basis of a deep learning model and include in-loop filter based on a denoising model. Therefore, in video encoding or decoding, it is necessary to consider continuous application of the deep learning-based video processing technology in order to improve encoding efficiency.

SUMMARY

An object of the present disclosure is to provide a video encoding or decoding apparatus and method for performing existing inter prediction on a current block to generate a motion vector and predicted samples. The apparatus and method are also for generating enhanced predicted samples for the current block using a deep learning-based video prediction network (VPN) on the basis of the motion vector, the reference samples, the predicted samples, and the like to improve encoding efficiency.

One aspect of the present disclosure provides an example of a video decoding apparatus. The video decoding apparatus comprises an entropy decoder configured to decode a motion vector for a current block and residual values from a bitstream. The video decoding apparatus also comprises an inter predictor configured to generate first predicted samples for the current block using reference samples in a reference picture indicated by the motion vector. The video decoding apparatus also comprises a video prediction network (VPN) configured to generate second predicted samples using all or some of the motion vector, the reference samples, and the first predicted samples. The video decoding apparatus also comprises an adder configured to add the residual values to the second predicted samples to generate a restoration block for the current block.

Another aspect of the present disclosure provides another example of a video decoding apparatus. The video decoding apparatus comprises an entropy decoder configured to decode a motion vector for a current block and residual values from a bitstream. The video decoding apparatus also comprises an inter predictor configured to generate first predicted samples for the current block using reference samples in a reference picture indicated by the motion vector. The video decoding apparatus also comprises a video prediction network (VPN) configured to generate a plurality of first motion vectors using the motion vector or motion vectors of neighboring blocks of the current block. The VPN is also configured to generate second predicted samples from the reference samples or the first predicted samples on the basis of the plurality of first motion vectors. The video decoding apparatus also comprises an adder configured to add the residual values to the second predicted samples to generate a restoration block for the current block.

Another aspect of the present disclosure provides an example of a video decoding method for performing inter prediction on a current block. The video decoding method is performed by a video decoding apparatus. The video decoding method comprises decoding a motion vector for the current block and residual values from a bitstream. The video decoding method also comprises generating first predicted samples for the current block using reference samples in a reference picture indicated by the motion vector. The video decoding method also comprises generating second predicted samples using deep learning-based video prediction network (VPN) on the basis of all or some of the motion vector, the reference samples, and the first predicted samples. The video decoding method also comprises adding the residual values to the second predicted samples to generate a restoration block for the current block.

As described above, according to the present embodiment, it is possible to provide a video encoding or decoding apparatus and method for performing existing inter prediction on a current block to generate a motion vector and predicted samples. The video encoding or decoding apparatus and method are also for generating enhanced predicted samples for the current block using a deep learning-based video prediction network (VPN) on the basis of the motion vector, the reference samples, the predicted samples, and the like to improve encoding efficiency according to performance enhancement of inter prediction.

DETAILED DESCRIPTION

Figure 1:
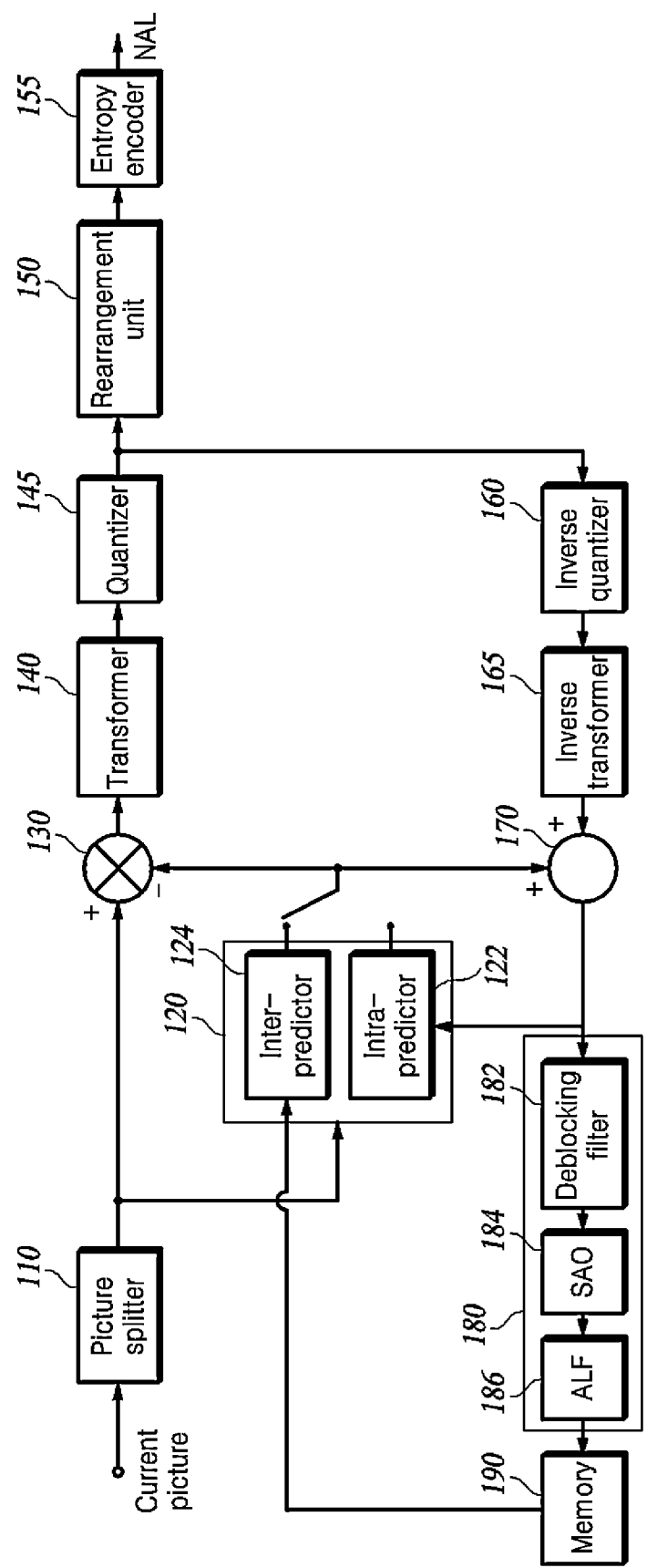
FIG. 1 is a block diagram of a video encoding apparatus that may implement the techniques of the present disclosure.

Hereinafter, embodiments of the present disclosure are described in detail with reference to drawings. When reference numerals refer to components of each drawing, it should be noted that, although the same or equivalent components are illustrated in different drawings, the same or equivalent components may be denoted by the same reference numerals. Further, in describing the embodiments, a detailed description of known related configurations and functions may be omitted to avoid unnecessarily obscuring the subject matter of the embodiments.

FIG. 1 is a block diagram for a video encoding apparatus which may implement technologies of the present disclosure. Hereinafter, referring to illustration of FIG. 1, the video encoding apparatus and sub-components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop-filter unit 180, and a memory 190.

Each component of the encoding apparatus may be implemented as hardware or software or implemented as a combination of hardware and software. Further, a function of each component may be implemented as the software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information (CTU size) on the size of the CTU is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
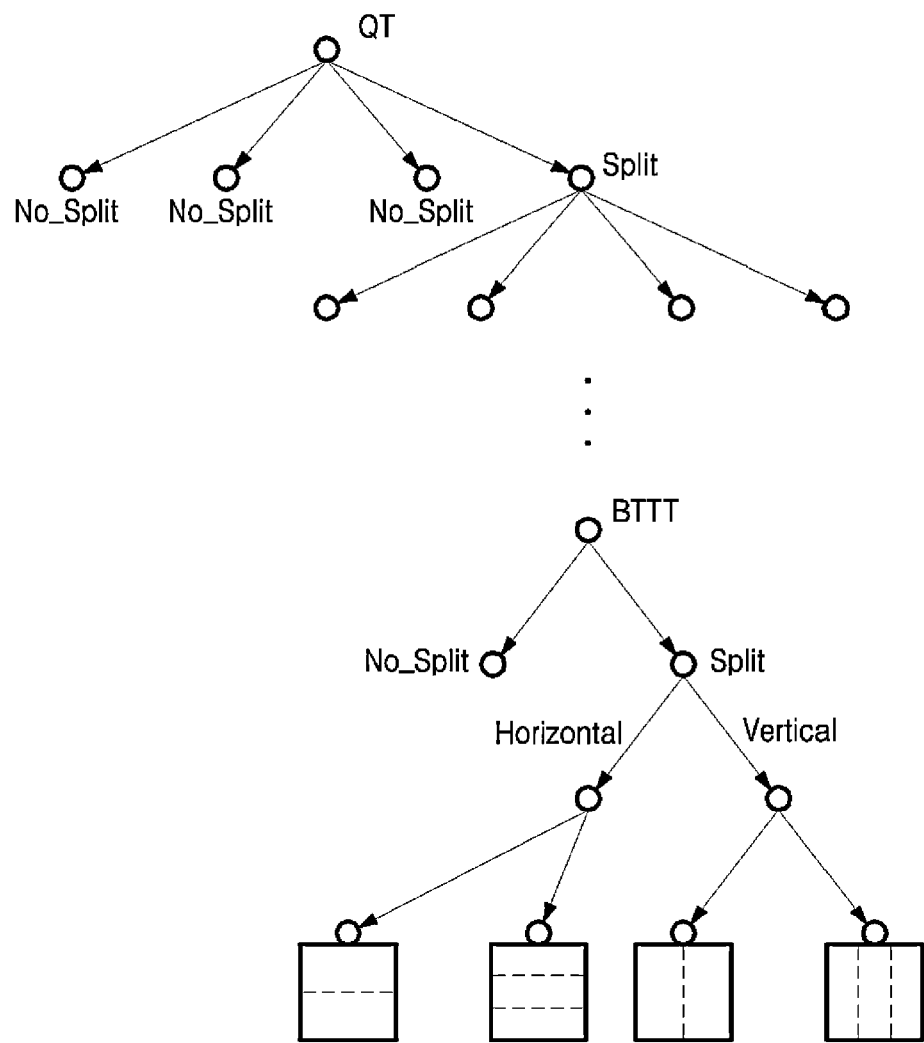
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., in a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the coding unit (CU), which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
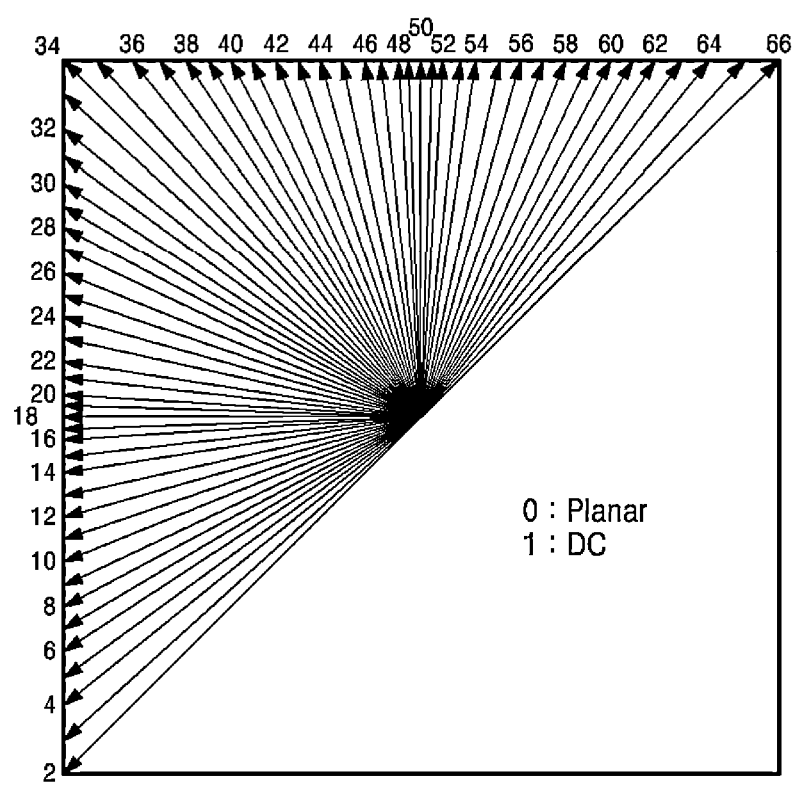
FIGS. 3A and 3B illustrate a plurality of intra prediction modes including wide-angle intra prediction modes.

The intra predictor 122 predicts pixels in the current block by using pixels (reference pixels) positioned on a neighboring of the current block in the current picture including the current block. There is a plurality of intra prediction modes according to the prediction direction. For example, as illustrated in FIG. 3A, the plurality of intra prediction modes may include 2 non-directional modes including a planar mode and a DC mode and may include 65 directional modes. A neighboring pixel and an arithmetic equation to be used are defined differently according to each prediction mode.

Figure 3B:
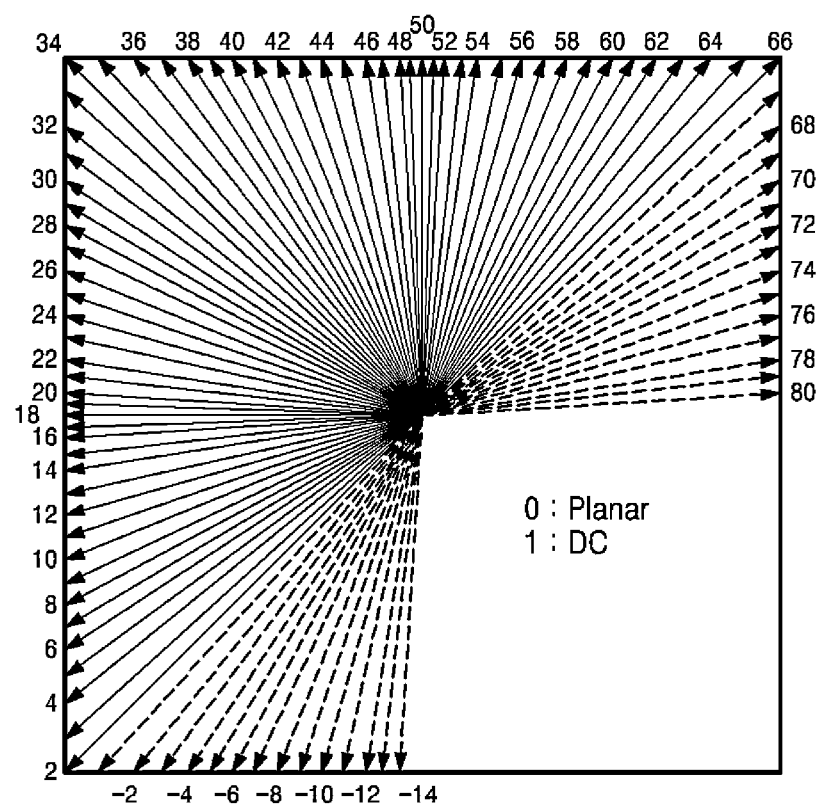

For efficient directional prediction for the current block having the rectangular shape, directional modes (#67 to #80, intra prediction modes #-1 to #-14) illustrated as dotted arrows in FIG. 3B may be additionally used. The direction modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
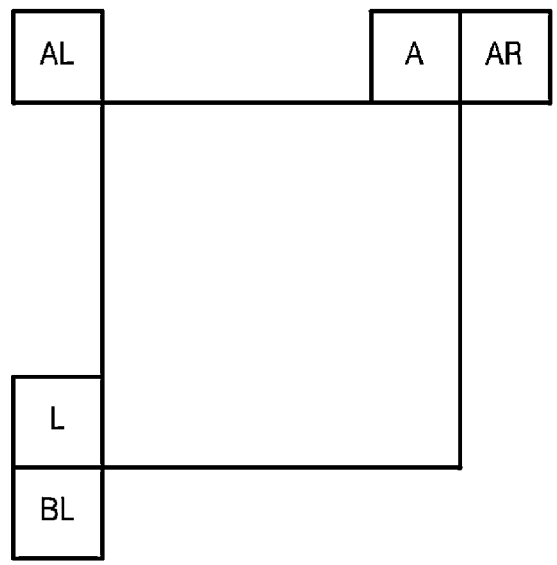
FIG. 4 illustrates neighboring blocks of a current block.

As a neighboring block for deriving the merge candidate, all or some of a left block L, a top block A, a top right block AR, a bottom left block BL, and a top left block AL adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting a residual signal. By using the merge skip mode, it is possible to achieve a relatively high encoding efficiency for images with slight motion, still images, screen content images, and the like.

Hereinafter, the merge mode and the merge skip mode are collectively called the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block L, a top block A, a top right block AR, a bottom left block BL, and a top left block AL adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of sub-blocks and perform the transform by using the sub-block as the transform unit. Alternatively, the residual block is divided into two sub-blocks, which are a transform area and a non-transform area to transform the residual signals by using only the transform area sub-block as the transform unit. Here, the transform area sub-block may be one of two rectangular blocks having a size ratio of 1:1 based on a horizontal axis (or vertical axis). In this case, a flag (cu_sbt_flag) indicates that only the sub-block is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area sub-block may have a size ratio of 1:3 based on the horizontal axis (or vertical axis), and in this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), Exponential Golomb, etc.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block are used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the restored pixel and an original pixel, which occurs due to lossy coding. The SAO filter 184 applies an offset as a CTU unit to enhance a subjective image quality and encoding efficiency. Contrary to this, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
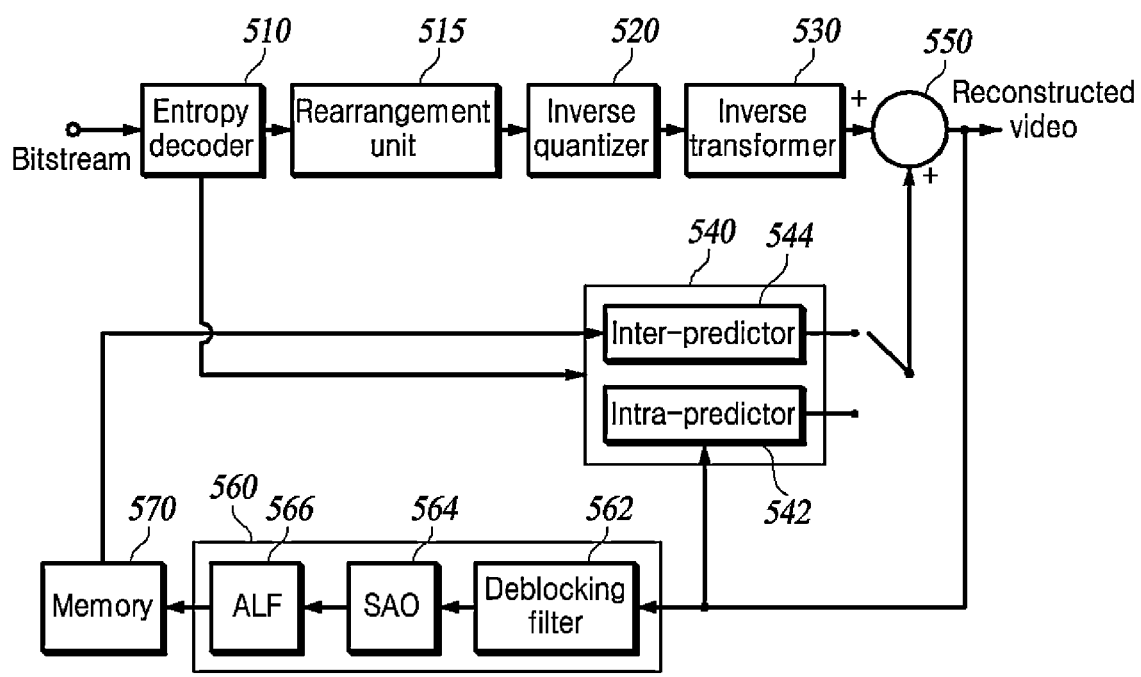
FIG. 5 is a block diagram of a video decoding apparatus that may implement the techniques of the present disclosure.

FIG. 5 is a functional block diagram for a video decoding apparatus, which may implement the technologies of the present disclosure. Hereinafter, referring to FIG. 5, the video decoding apparatus and sub-components of the apparatus are described.

The video decoding apparatus may be configured to include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU is extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (sub-block) of the transform block, the inverse transformer 530 extracts a flag (cu_sbt_flag) that only the sub-block of the transform block is transformed, directional (vertical/horizontal) information (cu_sbt_horizontal_flag) of the sub-block, and/or positional information (cu_sbt_pos_flag) of the sub-block. The inverse transformer 530 also inversely transforms the transform coefficients of the corresponding sub-block into the spatial domain from the frequency domain to restore the residual signals and fills an area, which is not inversely transformed with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transform unit output from the inverse transform unit and the prediction block output from the inter prediction unit or the intra prediction unit. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate a difference between the restored pixel and an original pixel, which occurs due to lossy coding. The filter coefficient of the ALF is determined by using information on a filter coefficient decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present embodiment relates to encoding or decoding of video(image) as described above. More specifically, the present embodiment provides a video encoding or decoding method for performing existing inter prediction on a current block to generate a motion vector and predicted samples. The video encoding or decoding method is also used for generating enhanced predicted samples for the current block using a deep learning-based video prediction network (VPN) on the basis of the motion vector, the reference samples, the predicted samples, and the like to improve encoding efficiency.

In the following description, the video encoding apparatus and method are used in parallel with an encoding apparatus and method, and the video decoding apparatus and method are used in parallel with a decoding apparatus and method.

The term 'target block' may be used in the same meaning as the current block or coding unit (CU) as described above, or the term 'target block' may mean a partial area of the coding unit.

Bidirectional Optical Flow (BDOF) is a technology for additionally compensating for a motion of samples predicted using bidirectional motion prediction on the basis of an optical flow (OF) under the assumption that samples or objects constituting a video move at a constant speed and there is little change in sample values.

Figure 14:
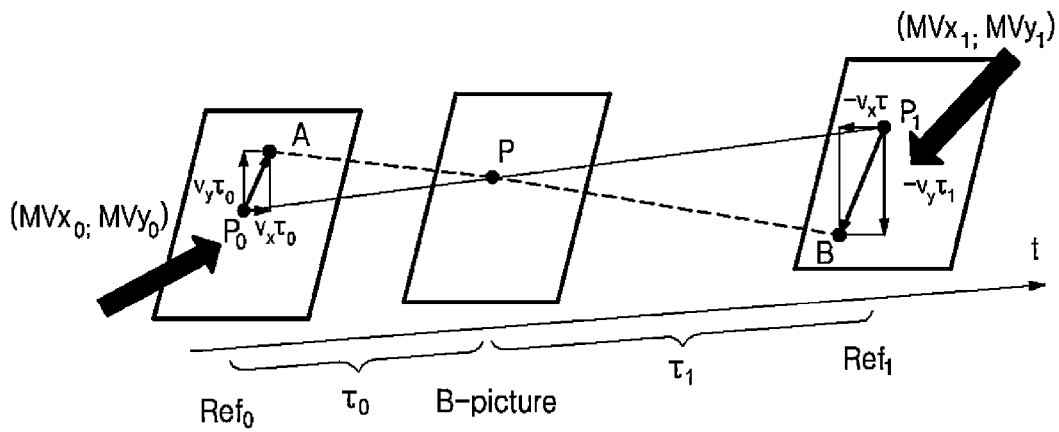
FIG. 14 is a diagram illustrating a concept of Bidirectional Optical Flow (BDOF).

It is assumed that bidirectional motion vectors $MV_0$ and $MV_1$ indicating corresponding areas (that is, reference blocks) most similar to the target block to be encoded of the current picture in reference pictures $Ref_0$ and $Ref_1$ are determined, as illustrated in FIG. 14, by (normal) bi-directional motion prediction for the target block. In this case, the two motion vectors are values representing a motion of the entire target block. In the example of FIG. 14, a sample in the reference picture $Ref_0$ indicated by the motion vector $MV_0$, which corresponds to a sample P in the target block, is $P_0$, and a sample in the reference picture $Ref_1$ indicated by the motion vector $MV_1$, which corresponds to the sample P in the target block, is $P_1$.

Hereinafter, in the example of FIG. 14, it is assumed that a motion of the sample P is slightly different from an overall motion of the target block. For example, when an object located at a sample A in $Ref_0$ passes through the sample P in the target block of the current picture and moves to a sample B in $Ref_1$, the sample A and the sample B should have very similar values. Therefore, a point in $Ref_0$ most similar to the sample P in the target block is not P0 indicated by the motion vector $MV_0$, but A obtained by moving P0 by a predetermined displacement vector $(v_x t_0, v_y t_0)$. Further, a point in $Ref_1$ most similar to the sample P in the target block is not P1 indicated by the motion vector $MV_1$, but B obtained by moving P1 by a predetermined displacement vector $(-v_x t_1, -v_y t_1)$. Here, $t_0$ and $t_1$ mean time axis distances to $Ref_0$ and $Ref_1$ with reference to the current picture, respectively, and are calculated on the basis of a picture order count (POC). In this case, $(v_x, v_y)$ is referred to as an OF. Accordingly, the OF indicates a motion vector on a pixel-by-pixel basis representing motion of pixels occurring between pictures.

In the BDOF, when a value of the sample P of the target block in the current picture is predicted, more accurate prediction is performed by using the values of the two reference samples A and B, as compared with a case in which prediction is performed by using the reference samples P0 and P1 indicated by the bidirectional motion vectors $MV_0$ and $MV_1$, i.e., the predicted samples.

A value of a predicted sample in the reference picture ($Ref_0$) indicated by the motion vector $MV_0$ corresponding to a (luma) pixel (x, y) in the target block is defined as $I^{(0)}(x, y)$, and a value of a predicted sample in the reference picture ($Ref_1$) indicated by the motion vector $MV_1$ corresponding to a sample (x, y) is defined as $I^{(1)}(x, y)$.

In the BDOF, a pixel value of the target block can be predicted using values of predicted samples for pixel, the OF, and a gradient in the predicted samples, as shown in Equation 1.

$$\text{pred}(x,y) = (I^{(0)}(x,y) + I^{(1)}(x,y) + b(x,y) + o_{\textit{offset}}) \gg \text{shift} \quad \text{[Equation 1]}$$

Here, the values of the predicted samples for the pixel are predicted on the basis of motion information (two motion vectors and two reference pictures) used for bi-directional prediction of inter prediction. Also, b(x, y) is a sample offset calculated using the OF and the gradient in the predicted sample. Further, shift is a scaling factor, and $o_{\textit{offset}}$ is a value for a rounding-off operation and half of the shift.

Meanwhile, the inter prediction is motion prediction in which a translation motion model is reflected. In other words, the inter prediction is a technology for predicting a motion in a horizontal direction (x-axis direction) and a vertical direction (y-axis direction). However, in reality, there may be various types of motions such as rotation, zoom-in, or zoom-out in addition to translational motion. In affine motion prediction, a motion vector in which such various types of motions can be reflected is generated, and then values of samples are predicted on a subblock-by-subblock basis of the target block using the motion vector.

Prediction refinement with OF (PROF) represents adjusting values of predicted samples according to affine motion prediction on a subblock-by-subblock basis, on a sample-by-sample basis on the basis of an optical flow. In other words, a motion according to a position of each sample is additionally compensated within the subblock, which is a unit in which the affine motion prediction is performed.

Figure 6:
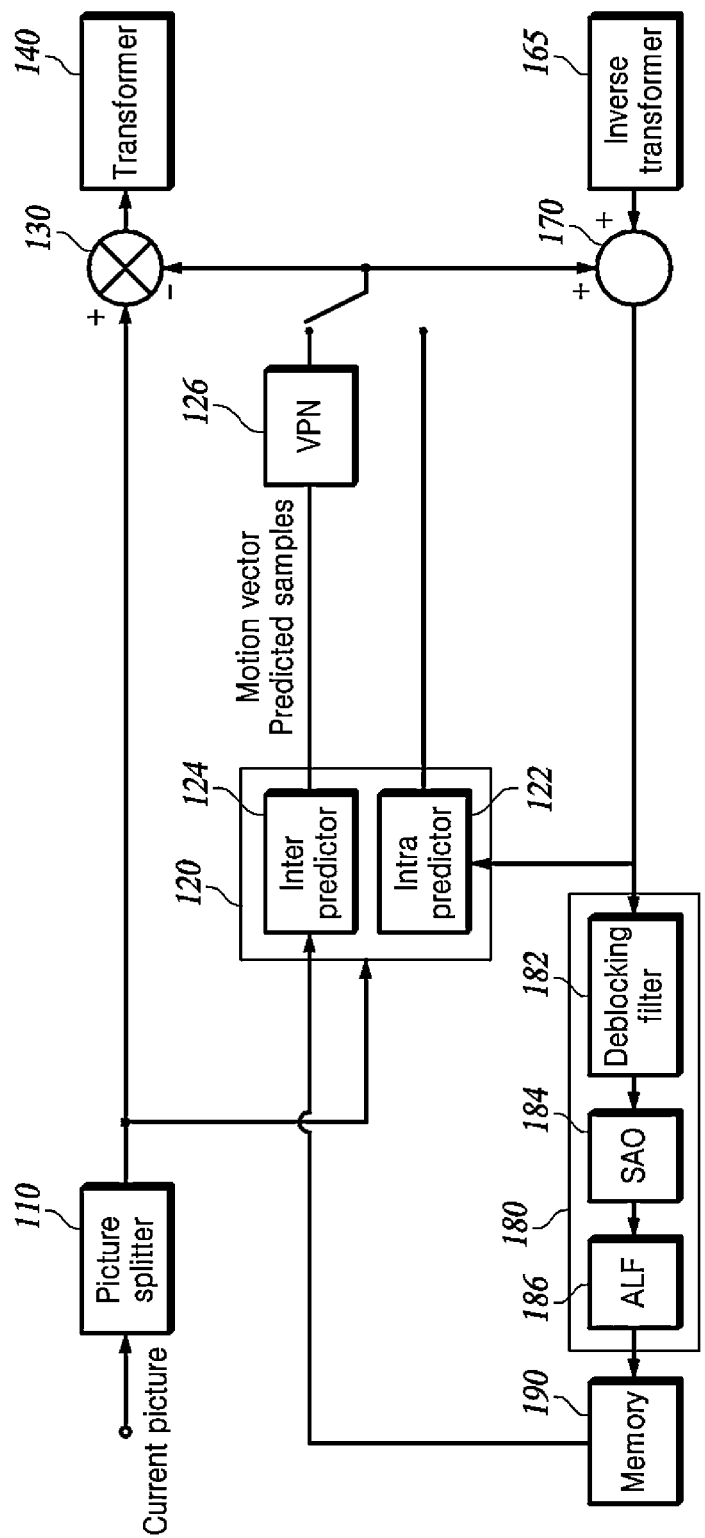
FIG. 6 is a block diagram of a video encoding apparatus using deep learning-based inter prediction according to an embodiment of the present disclosure.

FIG. 6 is a block diagram of a part of a video encoding apparatus using deep learning-based inter prediction according to an embodiment of the present disclosure.

The video encoding apparatus according to the present embodiment additionally includes a deep learning-based VPN 126 at a stage after the inter predictor 124, which is an existing component. Here, components included in the video encoding apparatus according to the present embodiment are not necessarily limited thereto. For example, the video encoding apparatus may additionally include a training unit (not illustrated) for training of a deep neural network (hereinafter referred also to as a 'deep learning model') included in the VPN 126. Alternatively, the video encoding apparatus may be implemented in a form interworking with an external training unit.

The inter predictor 124 searches for a reference block for the current block using a reference picture for the current block to be encoded and generates a prediction block including predicted samples for the current block from reference samples of the reference block that has been searched for. Further, the inter predictor 124 generates a motion vector corresponding to a displacement between the reference block and the current block. Meanwhile, in the case of bi-directional prediction, each of the number of reference blocks and the number of the motion vectors may be two, as described above.

Using all or some of the reference samples, the motion vectors, and the predicted samples, the VPN 126 generates enhanced predicted samples (hereinafter referred to as 'enhanced predicted samples') for the current block. Here, the enhanced predicted samples are included in a final prediction block. The VPN 126 may use a deep neural network in a process of generating the enhanced predicted samples.

The encoding apparatus may subtract the final prediction block from the current block to generate a residual block, input residual values of the residual block to the transformer 140, and perform the encoding process as described above.

Meanwhile, parameters of a deep neural network trained in advance may be shared between the encoding apparatus and the decoding apparatus.

Figure 7:
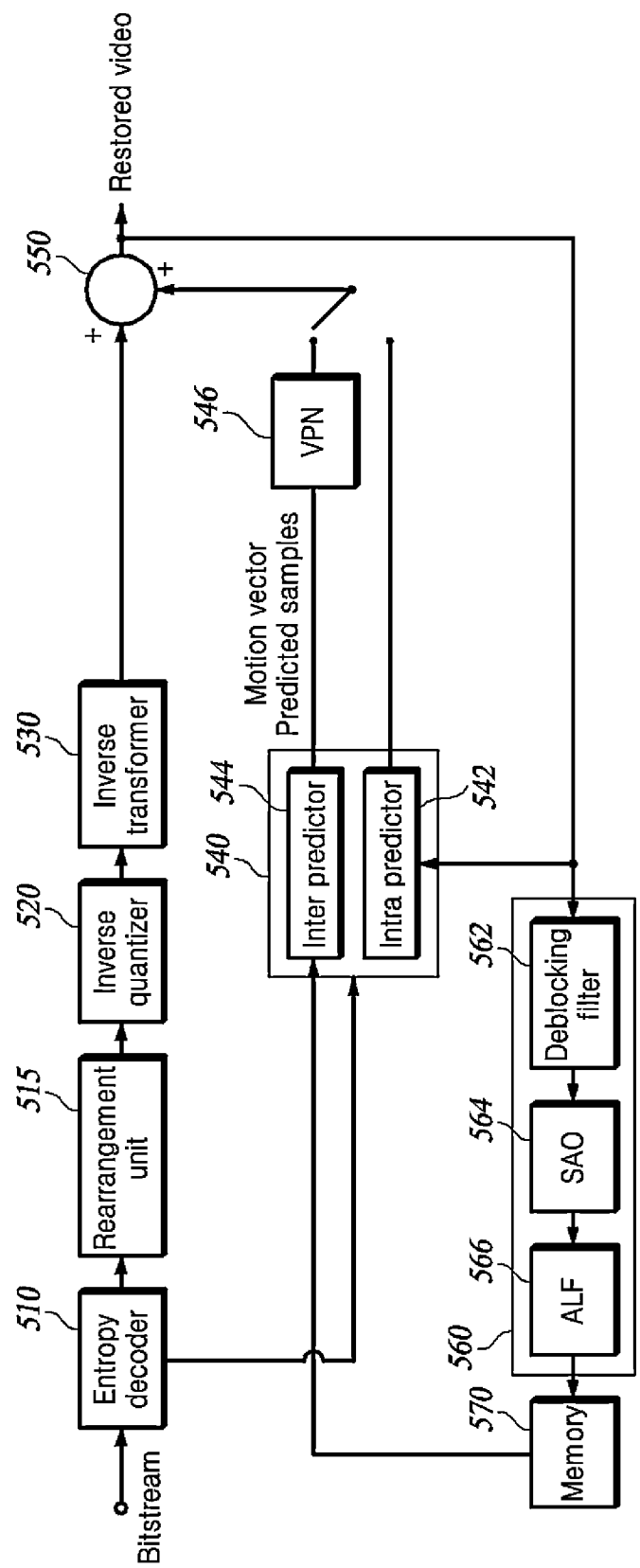
FIG. 7 is a block diagram of a video decoding apparatus using deep learning-based inter prediction according to an embodiment of the present disclosure.

FIG. 7 is a block diagram of the video decoding apparatus using deep learning-based inter prediction according to an embodiment of the present disclosure.

The video decoding apparatus according to the present embodiment additionally includes a deep learning-based VPN 546 at a stage after the inter prediction unit 544, which is an existing component.

The entropy decoder 510 decodes a motion vector for the current block to be decoded and the residual block including the residual values from the bitstream. In this case, the motion vector may be explicitly decoded from the bitstream in the case of an AMVP mode but may be estimated from neighboring motion vector information or a motion prediction mode in the case of the merge and skip mode. Meanwhile, in the case of bidirectional prediction, the number of motion vectors may be two, as described above.

The inter predictor 544 generates a prediction block including predicted samples for the current block from the reference samples using the motion vector. Here, the reference samples may be generated from the reference picture indicated by the motion vector.

The predicted samples may be adaptively generated according to the motion vector and the motion prediction mode. For example, when a size of the motion vector is zero, the predicted samples may be generated like samples utilized from a reference picture storage list.

Using all or some of the reference samples, motion vector, and the predicted samples, the VPN 546 generates enhanced predicted samples. Here, the enhanced predicted samples are included in the final prediction block. The decoding apparatus adds the residual values to the enhanced predicted samples to generate a restoration block for the current block.

Hereinafter, an operation of the VPN 546 in the decoding apparatus is described with reference to FIGS. 8-10. The following description can be equally applied to the VPN 126 in the encoding apparatus.

Figure 8:
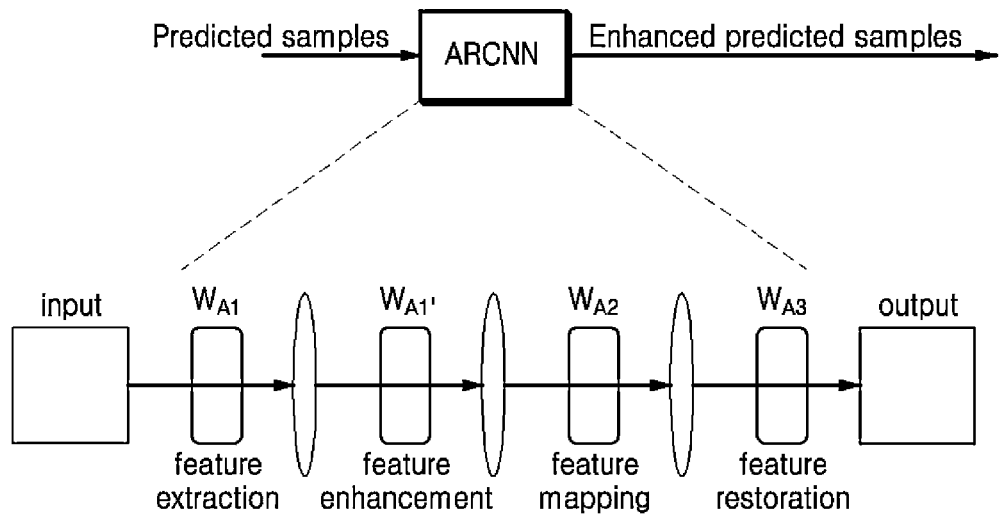
FIG. 8 is a schematic illustrative diagram of a video prediction network (VPN) based on an Artifacts Reduction Convolutional Neural Network (ARCNN) according to an embodiment of the present disclosure.

FIG. 8 is a schematic illustrative diagram of a VPN based on an Artifacts Reduction Convolutional Neural Network (ARCNN) according to an embodiment of the present disclosure.

In one example of the present disclosure, the VPN 546 may include an Artifacts Reduction Convolutional Neural Network (ARCNN), (see Non-patent literature: Chao Dong, Yubin Deng, Chen Change Loy, and Xiaoou Tang, Compression Artifacts Reduction by a Deep Convolutional Network, ICCV, 2015, which is incorporated herein by reference), which is a deep learning model suitable for removal of artifact. The ARCNN is one of image restoration models and is trained to restore an output video close to an original video when an input mixed with noise (for example, quantization noise) is given.

The ARCNN includes four blocks, as illustrated in FIG. 8, and each block is configured of convolution layers. The four blocks of the ARCNN sequentially perform feature extraction, enhancement, feature mapping, and video restoration on an input video containing noise.

In the present embodiment, the ARCNN receives predicted samples $X_{pred}$ as inputs and generates enhanced predicted samples $X_{fpred}$.

The ARCNN may be trained on the basis of training data (corresponding to the predicted samples) and a label $X_t$ corresponding to an original video. The training unit according to the present embodiment defines a loss function L, as shown in Equation 2, on the basis of a distance between the enhanced predicted samples $X_{fpred}$ generated from the training data by the ARCNN and the label $X_t$.

$$L=|X_{fpred}-X_t|^2 \quad \text{[Equation 2]}$$

The training unit performs training on the ARCNN by updating parameters of the ARCNN in a direction in which the loss function is reduced. Meanwhile, in Equation 2, an L2 metric is used as the distance, but anything capable of expressing a distance difference between two comparison targets like an L1 metric may be used.

Figure 9:
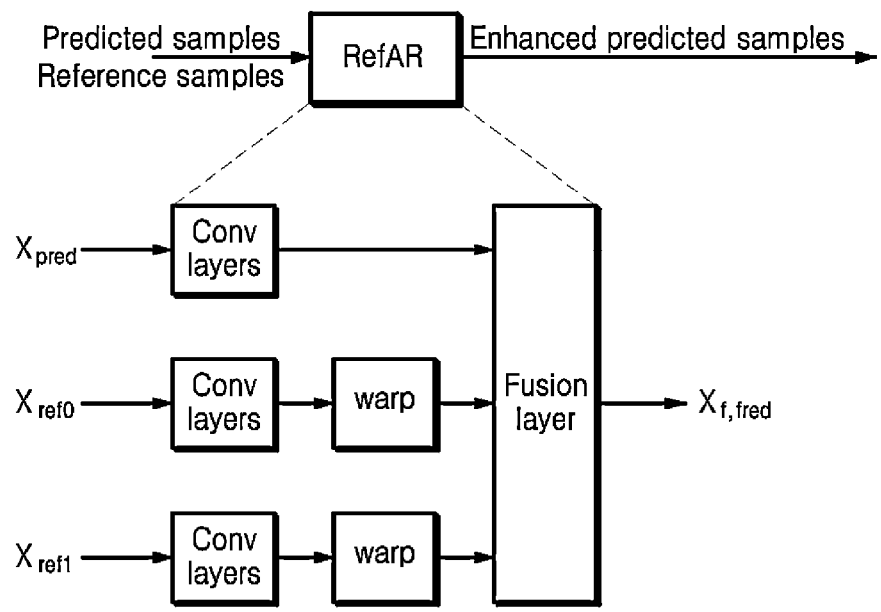
FIG. 9 is a schematic illustrative diagram of a VPN based on Reference-based Artifacts Reduction (RefAR) according to another embodiment of the present disclosure.

FIG. 9 is a schematic illustrative diagram of a VPN based on deep learning model Reference-based Artifacts Reduction (RefAR) according to another embodiment of the present disclosure.

In another embodiment of the present disclosure, the VPN 546 may include a deep learning model Reference-based Artifacts Reduction (RefAR); (see Non-patent literature: Ren Yang, Mai Xu, Zulin Wang and Tianyi Li, Multi-Frame Quality Enhancement for Compressed Video, Arxiv: 1803.04680, which is incorporated herein by reference) using past reference samples and future reference samples, in addition to the predicted samples $X_{pred}$. Here, the reference samples represent samples of a block referred to by a motion vector in a reference picture used in the inter prediction. In the case of bidirectional prediction, both past reference samples and future reference samples may be used, whereas in the case of unidirectional prediction, either past reference samples or future reference samples may be used.

Meanwhile, RefAR is one of video restoration models, and is trained to restore an output video close to the original video when an input with noise is given.

RefAR can be implemented in three stages including convolution layers, warps, and a fusion layer, as illustrated in FIG. 9. The convolution layers extract characteristics of predicted samples, past reference samples, and future reference samples. Since the past or future reference samples and the predicted samples do not match in time, the warp step includes applying the OF (or motion vector) to the past or future reference samples to match the time between the past or future reference samples and the predicted samples. The fusion layer performs fusing on the predicted samples and the past or future reference samples with adjusted time to generate the enhanced predicted samples.

In the present embodiment, RefAR receives the predicted samples $X_{pred}$, past reference samples $X_{ref0}$, and future reference samples $X_{ref1}$ as inputs, and RefAR generates the enhanced predicted samples $X_{f,pred}$.

RefAR may be trained on the basis of training data (corresponding to the predicted samples, future reference samples, and past reference samples) and the label $X_t$ corresponding to the original video. The training unit according to the present embodiment defines the loss function L, as shown in Equation 2, on the basis of the distance between the enhanced predicted samples $X_{f,pred}$ generated from the training data by RefAR and the label $X_t$. The training unit updates parameters of RefAR in a direction in which the loss function is reduced, and the training unit performs training on RefAR.

The scheme illustrated in FIGS. 8 and 9 above generates the enhanced predicted samples for the predicted samples of the current block on the basis of the deep learning model included in the VPN 546. In another embodiment of the present disclosure, the decoding apparatus may generate all predicted samples for one picture or slice, and then generate enhanced predicted samples for the one picture or slice on the basis of a deep learning model.

In the scheme illustrated in FIGS. 8 and 9, the enhanced predicted samples for the predicted samples are directly generated on the basis of the deep learning model included in the VPN 546. In another embodiment according to the present disclosure, the precision of the motion vector may be improved, and then enhanced predicted samples may be generated from the predicted samples using the motion vector with improved precision. In this case, the deep learning model may be used to generate an enhanced motion vector obtained by improving the precision of the motion vector.

Figure 10:
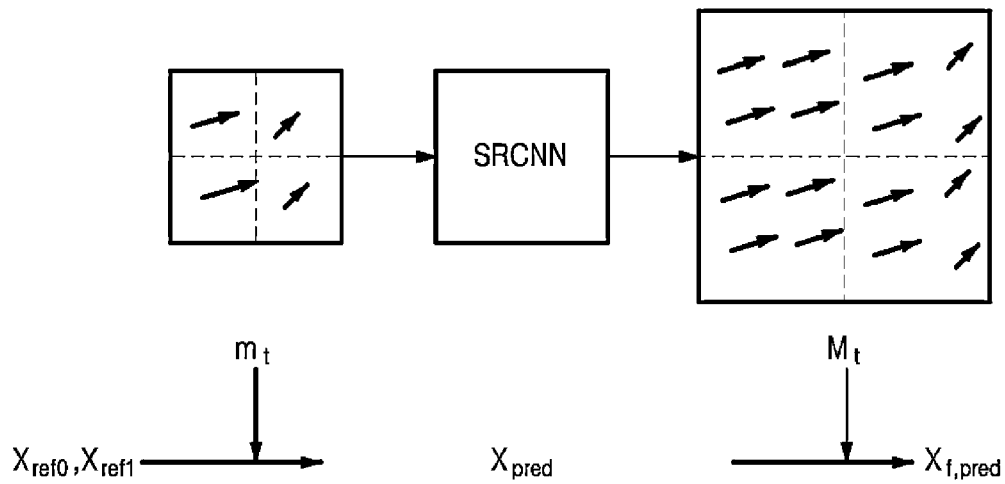
FIG. 10 is a schematic illustrative diagram of a VPN based on a Super-Resolution Convolutional Neural Network (SRCNN) according to another embodiment of the present disclosure.

FIG. 10 is a schematic illustrative diagram of the VPN on the basis of a Super-Resolution Convolutional Neural Network (SRCNN) according to another embodiment of the present disclosure.

First, a motion vector for generating predicted samples from reference samples is denoted by $m_t$. The motion vector is acquired on a block-by-block basis, and thus, in the case of bi-directional prediction, two motion vectors are determined for the current block. Meanwhile, in the case of unidirectional prediction, one motion vector may be determined.

Accordingly, $m_t$ of the plurality of blocks may form a two-dimensional array as illustrated in FIG. 10. In this case, in the two-dimensional array, each motion vector $m_t$ may be expressed by two coordinate values such as (x, y). In the case of a merge prediction mode, candidate blocks AR, A, AL, L, and BL, for example, may be used as a plurality of blocks for the current block. In other words, the two-dimensional array of the motion vectors may be generated by combining motion vectors of the candidate blocks.

In another embodiment according to the present disclosure, the two-dimensional array of the motion vectors may be generated by repeatedly arranging the motion vectors $m_t$ of the current block as many as the number of subsampled pixels of the current block. In this case, the motion vector $m_t$ may be expressed as two coordinate values such as (x, y).

Next, an enhanced motion vector on a pixel-by-pixel basis capable of generating enhanced predicted samples from predicted samples is denoted by $M_t$. For example, $M_t$ may be a motion vector on a pixel-by-pixel basis, like the OF. For the current block, an enhanced motion vector $M_t$ may also form a two-dimensional array using two (x, y) coordinate values, as illustrated in FIG. 10.

In this case, since the resolution of the two-dimensional array of the enhanced motion vectors $M_t$ is higher than the resolution of the two-dimensional array of the motion vectors $m_t$, the VPN 546 may include the SRCNN that is a super-resolution (SR) model to generate the enhanced motion vector $M_t$ in the present embodiment.

As the SRCNN, any deep learning model that includes at least one convolutional layer, receives a low-resolution video as an input, and generates a high-resolution video as an output can be used.

In the present embodiment, the SRCNN receives the two-dimensional array of the motion vectors $m_t$ as an input and generates the two-dimensional array of the enhanced motion vectors $M_t$.

In this case, each $m_t$ is used to generate the predicted samples $X_{pred}$ from the reference samples $X_{ref0}$ and $X_{ref1}$. Meanwhile, each improvement motion vector $M_t$ may be used, for example, to generate a sample offset for correcting the predicted samples $X_{pred}$, as in the BDOF as described above in the case of the OF for a pixel. As shown in Equation 1, the VPN 546 may add the predicted samples and the sample offset on a pixel-by-pixel basis to generate the enhanced predicted samples $X_{f,pred}$.

The SRCNN can be trained on the basis of training data corresponding to the motion vector and a label $M_{OF}$ corresponding to OF on a pixel-by-pixel basis. The training unit according to the present embodiment defines the loss function L, as shown in Equation 3, on the basis of a distance between the enhanced motion vector $M_t$ (i.e., the two-dimensional array of $M_t$) generated from the training data by the SRCNN and the label $M_{OF}$ (i.e., the two-dimensional array of the $M_{OF}$).

$$L=|M_t-M_{OF}|^2 \qquad \text{[Equation 3]}$$

The training unit performs training on the SRCNN by updating parameters of the SRCNN in a direction in which the loss function is reduced. Meanwhile, in Equation 3, an L2 metric is used as the distance, but anything capable of expressing a distance difference between two comparison targets like an L1 metric may be used.

Meanwhile, in another embodiment according to the present disclosure, the enhanced motion vector $M_t$ may be a motion vector on a pixel-by-pixel basis capable of generating an enhanced predicted sample from reference samples. Equation 1 shows a process of calculating the enhanced predicted sample from the reference sample for one pixel using the motion vector, the OF, and the gradient. Therefore, a relationship on a pixel-by-pixel basis between the reference sample and the enhanced predicted sample shown in Equation 1 can be assigned to the enhanced motion vector $M_t$. In this case, the VPN 546 may generate the enhanced predicted samples on a pixel-by-pixel basis from the reference samples using the enhanced motion vector $M_t$.

The SRCNN can be trained on the basis of the training data corresponding to the motion vector, and a label $M_{pix}$ corresponding to a motion vector on a pixel-by-pixel basis. The training unit according to the present embodiment defines the loss function L, as shown in Equation 4, on the basis of a distance between the enhanced motion vector $M_t$ (i.e., the two-dimensional array of $M_t$) generated from training data by the SRCNN and the label $M_{pix}$ (i.e., a two-dimensional array for $M_{pix}$).

$$L=|M_t-M_{pix}|^2 \qquad \text{[Equation 4]}$$

The training unit may perform training on the SRCNN by updating parameters of the SRCNN in a direction in which the loss function is reduced.

As described above, ARCNN, RefAR, and SRCNN are all CNN-based deep neural networks including a convolutional layer, but the deep neural network included in the VPN according to the present embodiment is not necessarily limited to the CNN-based deep neural network. The deep neural network may include, as components, a convolution layer, a pooling layer, a nonlinear activation function, a matrix multiplication layer, a fully connected layer, and the like. Accordingly, the VPN according to the present embodiment may include a deep neural network including all or some of the components described above and use the deep neural network in a process of generating enhanced predicted samples.

Hereinafter, a method of combining existing inter prediction schemes with the VPN according to the present embodiment is described. In the following description, the VPN 546 of the decoding apparatus is used, but the same applies to the VPN 126 of the encoding apparatus.

The VPN 546 may be combined with the motion vector and the predicted samples acquired by applying the AMVP mode or the merge mode. In this case, the encoding apparatus may transmit a flag indicating whether the VPN 546 is to be applied, and the decoding apparatus may determine whether or not the VPN 546 is to be applied on the basis of the received flag.

A picture that includes a restoration block generated by adding the residual values and the final prediction block including the enhanced predicted samples generated by the VPN 546 may be used to replace an existing reference picture included in the reference picture list or may be added as a new reference picture. Then, in a process of predicting the current block, the index of the reference picture based on the enhanced predicted samples may be selected from the reference picture list and used as reference samples.

In a case in which PROF or BDOF is applied after inter prediction according to the AMVP mode or the merge mode is performed, the VPN 546 may use the SRCNN, as described above. In this case, whether or not to apply the SRCNN is determined as in an application condition of the BDOF or PROF. Further, the enhanced motion vector $M_t$ has the same precision as the OF used in the BDOF or PROF.

When the enhanced motion vector $M_t$ based on the SRCNN is used, a maximum value of the enhanced motion vector is set not to exceed a maximum value of a motion vector provided by the existing inter prediction.

When inter prediction according to the AMVP mode or the merge mode is performed, an order of motion vector candidates in a motion vector candidate list is determined according to a block position, as described above. However, when the final prediction block generated using the VPN 546 is present around the current block, a higher priority may be assigned to a motion vector for the final prediction block (i.e., a motion vector used for generation of the predicted samples used for generation of the final prediction block). For example, the motion vector may be located in a highest order in the motion vector candidate list.

Hereinafter, a method of applying the VPN to the merge mode in the inter prediction according to the present embodiment is described.

Figure 11:
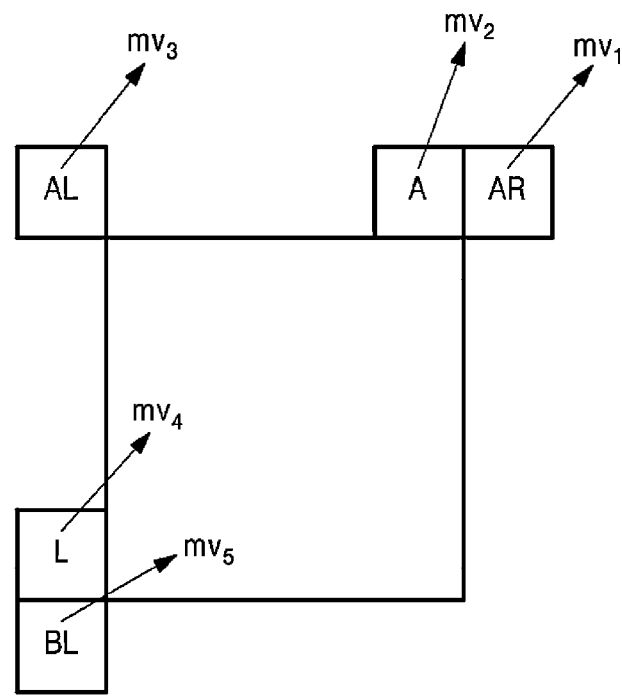
FIG. 11 is a diagram of a method of applying a VPN in a merge mode according to an embodiment of the present disclosure.

FIG. 11 is a diagram of a method of applying a VPN in the merge mode according to an embodiment of the present disclosure.

Even when the VPN is used, the encoding apparatus or the decoding apparatus can perform merge mode prediction on the current block on the basis of a motion vector corresponding to a previously encoded block.

First, the encoding apparatus selects a position of a candidate block for predicting the current block for merge mode prediction. For example, the encoding apparatus selects an AR block and extracts the corresponding motion vector $mv_1$. The encoding apparatus derives the predicted samples for the current block from the reference samples in the reference picture using the motion vector $mv_1$. The encoding apparatus generates a virtual block V' from all or some of the motion vector, the reference samples, and the predicted samples using the deep learning model included in the VPN 126. The encoding apparatus applies this process to the candidate blocks (A, AL, L, and BL) and $mv_2$ to $mv_5$ other than the AR block and $mv_1$ in order so as to find an optimal virtual block V' in terms of rate distortion, and then extracts a position (for example, AR) of the corresponding candidate block. The encoding apparatus may replace and use an AR index in an existing merge candidate list to indicate that the current block has selected the virtual block V' as the final prediction block. In this case, the encoding apparatus sets the motion vector of the virtual block V' to $mv_1$.

In the above description, ARCNN or RefAR may be used as the deep learning model included in the VPN 126 for generating V', as described above.

Meanwhile, the decoding apparatus decodes an index for merge mode prediction from the bitstream. For example, an index for a neighboring block AR is decoded. The decoding apparatus derives the predicted samples for the current block from the reference samples in the reference picture using the motion vector $mv_1$ corresponding to the AR. The decoding apparatus may generate the virtual block V' from all or some of the motion vector, the reference samples, and the predicted samples using the deep learning model included in the VPN 546. The decoding apparatus may use the virtual block V' as the final prediction block for the current block.

In another embodiment according to the present disclosure, the encoding apparatus or the decoding apparatus may generate prediction blocks for the current block on the basis of $mv_1$ to $mv_5$ of all the candidate blocks (AR, A, AL, L, and BL) and then generate the virtual block V' using the VPN on the basis of a combination (for example, a weighted sum) of one or more prediction blocks.

In another embodiment according to the present disclosure, the encoding apparatus or the decoding apparatus may improve the motion vector corresponding to the previously encoded block and perform the merge mode prediction on the current block.

First, the encoding apparatus selects a position of a candidate block for predicting the current block for merge mode prediction. For example, the encoding apparatus selects an AR block and extracts the corresponding motion vector $mv_1$. The encoding apparatus derives the predicted samples for the current block from the reference samples in the reference picture using the motion vector $mv_1$. The encoding apparatus generates an enhanced motion vector from the motion vector using the deep learning model included in the VPN 126 and generates the virtual block V' using the predicted samples and the enhanced motion vector. The encoding apparatus applies this process to the candidate blocks (A, AL, L, and BL) and $mv_2$ to $mv_5$ other than the AR block and $mv_1$ in order to or so as to find an optimal virtual block V' in terms of rate distortion, and then the encoding apparatus extracts a position (for example, AR) of the corresponding candidate block. The encoding apparatus may replace and use the AR index in the existing merge candidate list to indicate that the current block has selected the virtual block V' as the final prediction block. In this case, the encoding apparatus sets the motion vector of the virtual block V' to $mv_1$.

In the above description, the SRCNN as described above may be used as the deep learning model included in the VPN 126 for generating V'. The motion vector of the current block is repeatedly arranged as many as the number of subsampled pixels of the current block so that the two-dimensional array of motion vectors input to the SRCNN can be generated. Further, in a two-dimensional array of the enhanced motion vectors that are outputs of the SRCNN, each enhanced motion vector may be the OF on a pixel-by-pixel basis.

Meanwhile, the decoding apparatus decodes the index for merge mode prediction from the bitstream. For example, the index for the neighboring block AR is decoded. The decoding apparatus derives the predicted samples for the current block from the reference samples in the reference picture using the motion vector $mv_1$ corresponding to the AR. The decoding apparatus may generate the enhanced motion vector from the motion vector using the deep learning model included in the VPN 546, generate the virtual block V' using the predicted samples and the enhanced motion vector, and use the virtual block V' as the final prediction block for the current block.

In another embodiment according to the present disclosure, the encoding apparatus or the decoding apparatus may generate the prediction blocks for the current block on the basis of $mv_1$ to $mv_5$ of all the candidate blocks (AR, A, AL, L, and BL) and generate the two-dimensional array of the enhanced motion vectors on a pixel-by-pixel basis using the SRCNN on the basis of the two-dimensional array formed by combining one or more of $mv_1$ to $mv_5$. The encoding apparatus or decoding apparatus may use the combination (for example, the weighted sum) of one or more prediction blocks and the enhanced motion vector on a pixel-by-pixel basis to generate the virtual block V'.

In another embodiment according to the present disclosure, the encoding apparatus or the decoding apparatus may add a separate index to the existing merge candidate list to indicate that V', not an existing candidate block, has been selected as the final prediction block for the current block. In this case, the encoding apparatus or the decoding apparatus may set a motion vector of V' as a zero vector or as an existing motion vector mv (i.e., a motion vector used to generate V').

Figure 12:
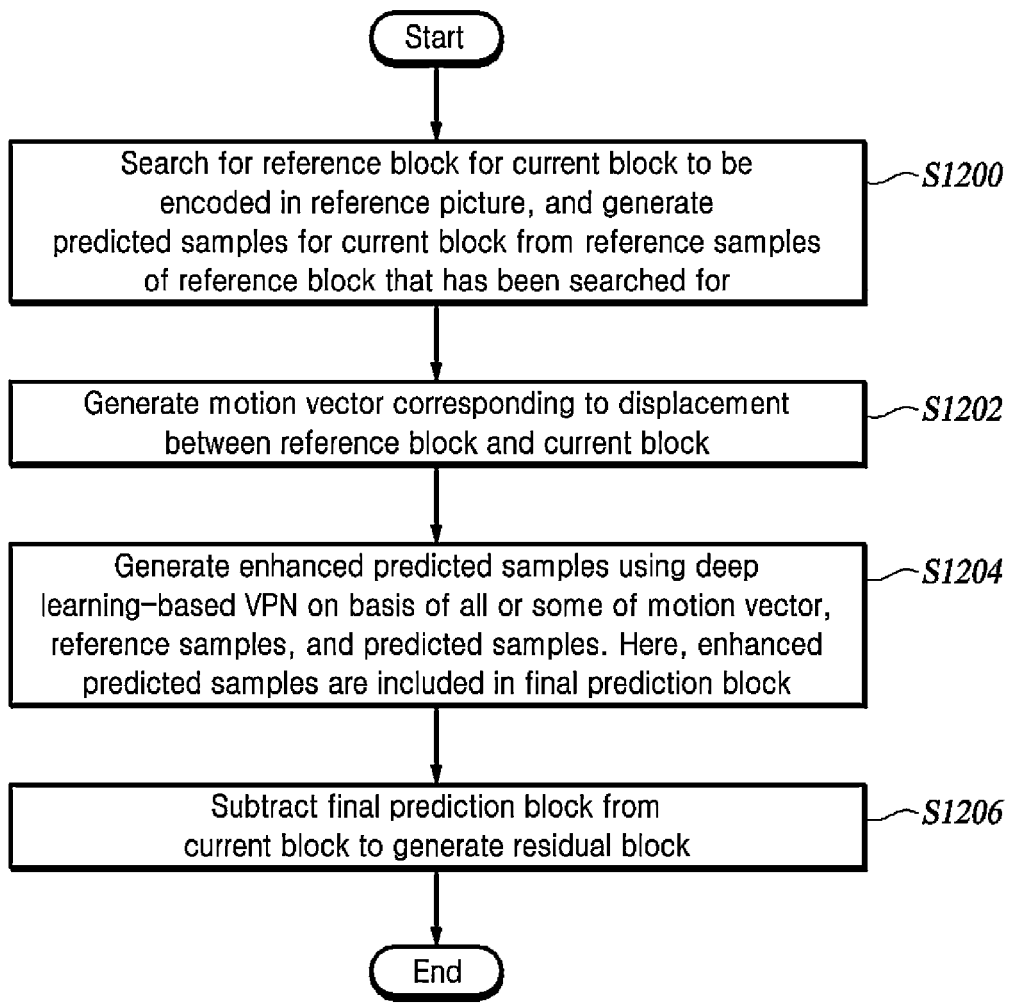
FIG. 12 is a flowchart of a video encoding method using deep learning-based inter prediction according to an embodiment of the present disclosure.

FIG. 12 is a flowchart of a video encoding method using deep learning-based inter prediction according to an embodiment of the present disclosure.

The encoding apparatus searches for the reference block for the current block to be encoded in the reference picture and generates the predicted samples for the current block from reference samples of the reference block that has been searched for (S1200).

Further, the encoding apparatus generates the motion vector corresponding to the displacement between the reference block and the current block (S1202). Here, in the case of bi-directional prediction, each of the number of reference blocks and the number of the motion vectors may be two, as described above.

The encoding apparatus generates the enhanced predicted samples using the deep learning-based VPN on the basis of all or some of the motion vector, the reference samples, and the predicted samples (S1204). Here, the enhanced predicted samples are included in the final prediction block.

Further, the VPN 126 includes an ARCNN that is a deep learning model suitable for noise removal, and the ARCNN is trained to receive the predicted samples as inputs and generate the enhanced predicted samples.

In another embodiment of the present disclosure, the VPN 126 includes RefAR that is a deep learning model that uses predicted samples and reference samples. The RefAR is trained to receive the predicted samples, the past reference samples, the future reference samples, and the motion vector as inputs and generate the enhanced predicted samples.

In another embodiment of the present disclosure, the VPN 126 includes an SRCNN that is a deep learning model that receives a low-resolution video as an input and generates a high-resolution video as an output. The SRCNN is trained to receive a two-dimensional array including a plurality of motion vectors as an input and generate a two-dimensional array including a plurality of enhanced motion vectors.

The plurality of enhanced motion vectors may be used to generate the sample offset for correcting predicted samples, for example, in the case of the OF for a pixel. The VPN 126 may add the predicted samples and the sample offset on a pixel-by-pixel basis to generate the enhanced predicted samples.

In another embodiment according to the present disclosure, the plurality of enhanced motion vectors may be motion vectors on a pixel-by-pixel basis capable of generating the enhanced predicted samples from the reference samples. The VPN 126 may generate the enhanced predicted samples on a pixel-by-pixel basis from the reference samples using the enhanced motion vector.

The encoding apparatus subtracts the final prediction block from the current block to generate the residual block (S1206). The encoding apparatus may input the residual values of the residual block to the transformer 140 and perform the encoding process as described above.

Meanwhile, parameters of a deep learning model trained in advance may be shared between the encoding apparatus and the decoding apparatus.

Figure 13:
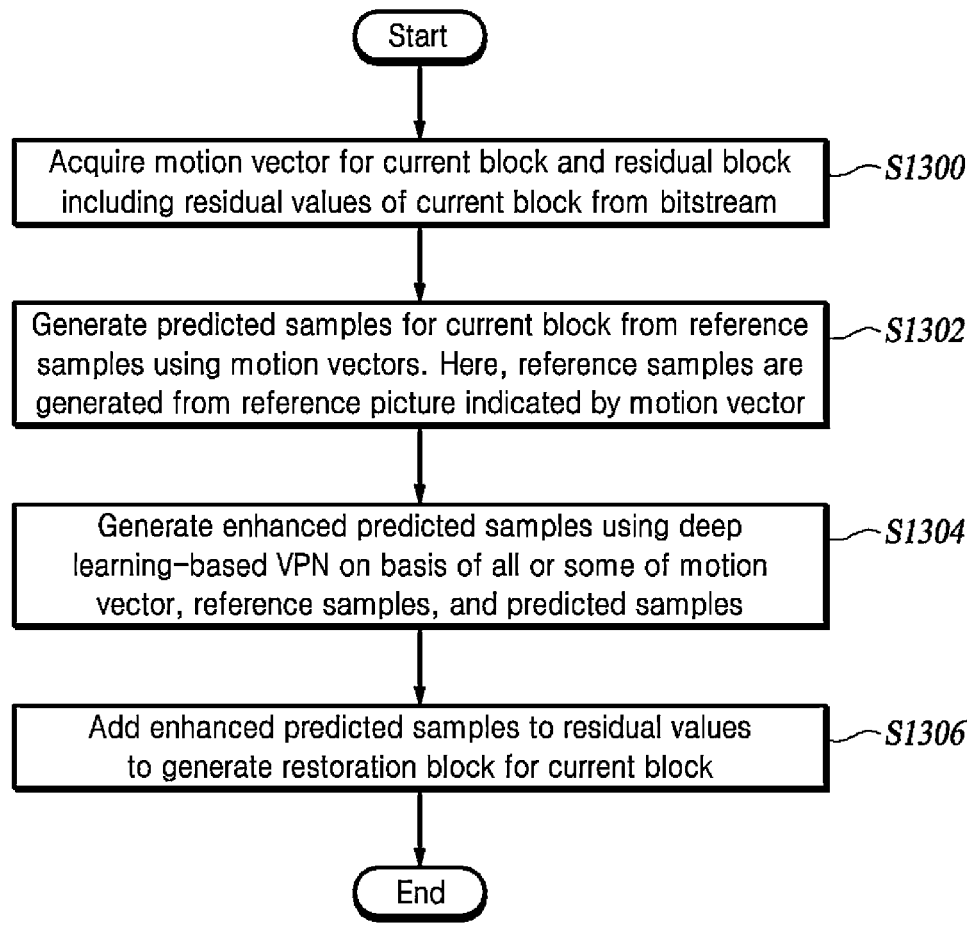
FIG. 13 is a flowchart of a video decoding method using deep learning-based inter prediction according to an embodiment of the present disclosure.

FIG. 13 is a flowchart of the video decoding method using deep learning-based inter prediction according to an embodiment of the present disclosure.

The decoding apparatus acquires, for the current block to be decoded, a motion vector for the current block and the residual block including residual values of the current block from a bitstream (S1300). In the case of bidirectional prediction, the number of motion vectors may be two, as described above.

The decoding apparatus generates the predicted samples for the current block from reference samples using the motion vectors (S1302). Here, the reference samples may be generated from a reference picture indicated by the motion vector.

The decoding apparatus generates the enhanced predicted samples using the deep learning-based VPN on the basis of all or some of the motion vector, the reference samples, and the predicted samples (S1304). Here, the enhanced predicted samples are included in the final prediction block.

The decoding apparatus adds the enhanced predicted samples to the residual values to generate a restoration block for the current block (S1306).

In each flowchart according to the embodiment, it is described that respective processes are executed in sequence, but the present disclosure is not limited thereto. In other words, since it is applicable that the processes described in the flowchart are changed and executed or one or more processes are executed in parallel, the flowchart is not limited to a time series order.

Meanwhile, various functions or methods described in the present disclosure may also be implemented by instructions stored in a non-transitory recording medium, which may be read and executed by one or more processors. The non-transitory recording medium includes, for example, all types of recording devices storing data in a form readable by a computer system. For example, the non-transitory recording medium includes storage media such as an erasable programmable read only memory (EPROM), a flash drive, an optical driver, a magnetic hard drive, and a solid state drive (SSD).

Although embodiments of the present disclosure have been described for illustrative purposes, those having ordinary skill in the art should appreciate that various modifications, additions, and substitutions are possible, without departing from the idea and scope of the claims. Therefore, embodiments of the present disclosure have been described for the sake of brevity and clarity. The scope of the technical idea of the present embodiments is not limited by the illustrations. Accordingly, one of ordinary skill would understand the scope of the claims is not to be limited by the above explicitly described embodiments but by the claims and equivalents thereof.

REFERENCE NUMERALS

124: inter predictor
126: VPN
130: subtractor
140: transformer
510: entropy decoder
544: inter predictor
546: VPN
550: adder

What is claimed is:

1. A video decoding apparatus comprising:
an entropy decoder configured to decode a motion vector for a current block and residual values from a bitstream;
an inter predictor configured to generate first predicted samples for the current block using reference samples in a reference picture and the motion vector;
a module configured to include a neural network and generate second predicted samples based on all or some of the motion vector, reference samples of at least one reference picture, and the first predicted samples; and
an adder configured to add the residual values to the first predicted samples or the second predicted samples to generate a restoration block for the current block,
wherein the motion vector is acquired by applying an advanced motion vector prediction (AMVP) mode or a merge mode, and wherein whether or not to use the second predicted samples obtained by the module is determined based on information decoded from the bitstream, and
wherein, when an inter prediction mode of the current block is an AMVP mode or a merge mode, and neighboring blocks of the current block are predicted using the neural network, priorities of the motion vectors corresponding to the neighboring blocks in a motion vector candidate list are set to be high.

2. The video decoding apparatus according to claim 1, wherein the module includes a first video restoration model as the neural network, wherein the first video restoration model receives the first predicted samples as an input and generates the second predicted samples, and wherein the first video restoration model is pre-trained so that the second predicted samples are close to an original video of the current block.

3. The video decoding apparatus according to claim 1, wherein the module includes a second video restoration model as the neural network, wherein the second video restoration model receives the first predicted samples, past reference samples, future reference samples, and the motion vector as inputs, and generates the second predicted samples, and wherein the second video restoration model is pre-trained so that the second predicted samples are close to an original video of the current block.

4. The video decoding apparatus according to claim 1, wherein, when inter prediction according to a merge mode is performed, the inter predictor selects a neighboring block from a motion vector candidate list, and generates the first predicted samples for the current block using reference samples in the reference picture indicated by a motion vector corresponding to the selected neighboring block, and wherein the neural network generates a virtual block using all or some of the motion vector, the reference samples, and the first predicted samples, and uses the virtual block as second predicted samples for the current block.

5. The video decoding apparatus according to claim 4, wherein, when the virtual block other than existing neighboring block included in the motion vector candidate list is selected and used as the second predicted samples, a new index added to the motion vector candidate list is used to indicate the virtual block, and a motion vector for the virtual block is set to a zero vector.

6. A video encoding apparatus comprising:
an inter predictor configured to generate first predicted samples for a current block using a motion vector and a reference picture;
a module configured to include a neural network and generate second predicted samples based on all or some of the motion vector, reference samples of at least one reference picture, and the first predicted samples;
a subtractor configured to generate residual values based on the first predicted samples or the second predicted samples; and
an entropy encoder configured to encode the motion vector and information indicating whether or not to use the second predicted samples obtained by the module,
wherein the motion vector is encoded according to an advanced motion vector prediction (AMVP) mode or a merge mode, and
wherein, when an inter prediction mode of the current block is an AMVP mode or a merge mode, and neighboring blocks of the current block are predicted using the neural network, priorities of the motion vectors corresponding to the neighboring blocks in a motion vector candidate list are set to be high.

7. An apparatus for transmitting a bitstream containing encoded video data, the apparatus comprising:
a video encoder configured to generate the bitstream by predicting a current block using an inter-prediction and transmit the bitstream,
wherein the video encoding apparatus comprises:
an inter predictor configured to generate first predicted samples for the current block using a motion vector and a reference picture;
a module configured to include a neural network and generate second predicted samples based on all or some of the motion vector, reference samples of at least one reference picture, and the first predicted samples;
a subtractor configured to generate residual values based on the first predicted samples or the second predicted samples; and an entropy encoder configured to encode the motion vector and information indicating whether or not to use the second predicted samples obtained by the module, wherein the motion vector is encoded according to an advanced motion vector prediction (AMVP) mode or a merge mode, and wherein, when an inter prediction mode of the current block is an AMVP mode or a merge mode, and neighboring blocks of the current block are predicted using the neural network, priorities of the motion vectors corresponding to the neighboring blocks in a motion vector candidate list are set to be high.

\* \* \* \* \*